Figure 1:
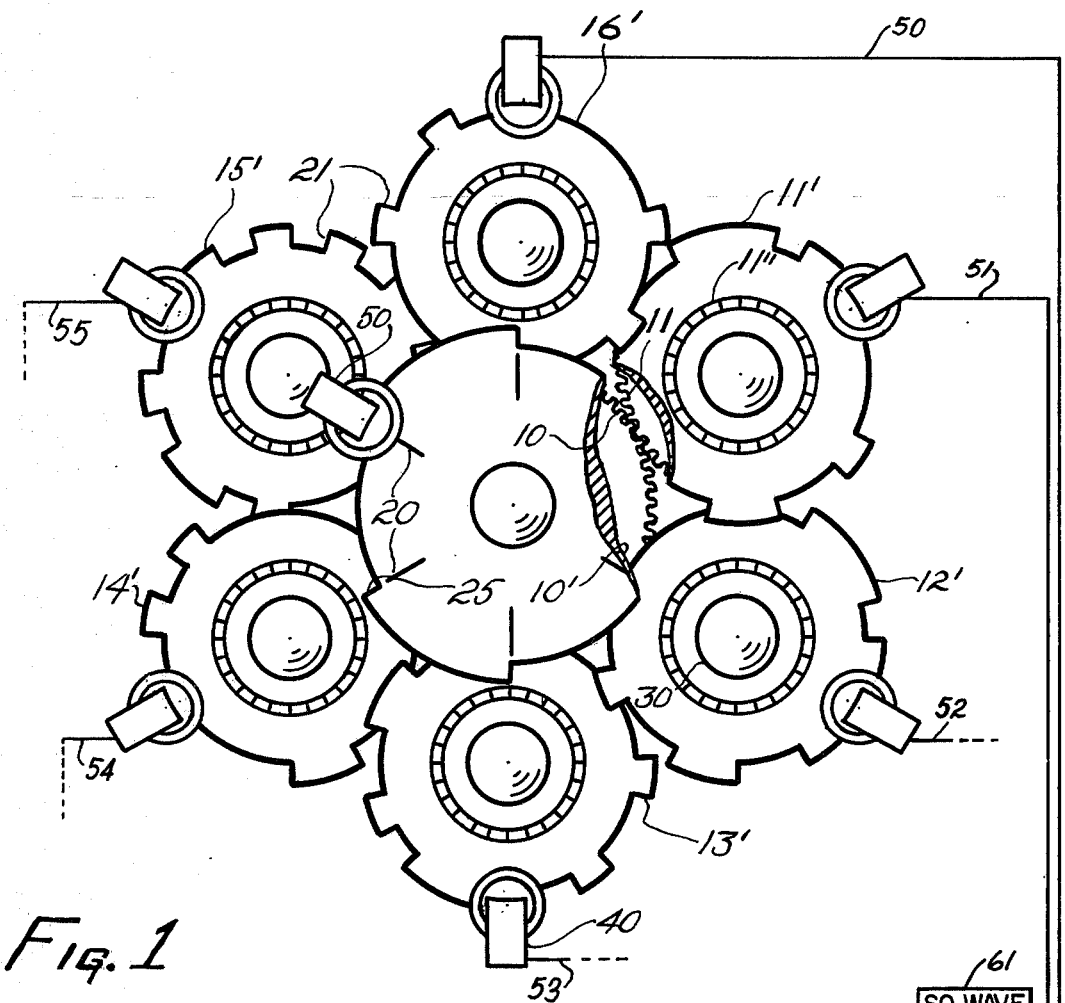

United States Patent [19]

DeWeese, Jr. et al.

[11] 4,187,393
[45] Feb. 5, 1980

[54] KEY GENERATOR

[76] Inventors: Eugene R. DeWeese, Jr., 1531 Queens Ct., Claremont, Calif. 91711; Lynn W. Marsh, Jr., 1106 N. Garfield St., Boston, Mass. 02114

[21] Appl. No.: 530,216

[22] Filed: Aug. 23, 1955

[51] Int. Cl.² ............................ G09C 5/00; H04L 9/04
[52] U.S. Cl. ........................................... 178/22; 35/4; 340/348; 340/354; 340/357
[58] Field of Search ................... 35/4, 2, 3; 178/22; 340/348, 354, 357

[56] References Cited

U.S. PATENT DOCUMENTS

| | | | |
|---|---|---|---|
| 1,356,546 | 10/1920 | Morehouse | 178/22 |
| 1,912,983 | 6/1933 | Jipp et al. | 178/22 |
| 2,139,676 | 12/1938 | Friedman | 35/4 |
| 2,425,616 | 8/1947 | Hallborg et al. | 178/22 X |

Primary Examiner—Malcolm F. Hubler
Attorney, Agent, or Firm—John R. Utermohle

EXEMPLARY CLAIM

2. An apparatus for producing a substantially noncyclic sequence of binary electric values, including a driving gear, a plurality of driven gears associated with said driving gear, each of said driven gears having a pattern disc carried thereby, each said disc having a plurality of radial slots in its periphery, means for utilizing the slots of each said disc to produce a sequence of binary electric values, means for substantially combining pairs of sequences so produced, value by value, to produce a lesser number of new sequences of binary electric values, and means for combining said new sequences in pairs, value by value.

3 Claims, 2 Drawing Figures

KEY GENERATOR

This invention is in cryptographic apparatus and more specifically is a high speed electromechanical machine for controlling the generation of cryptographic key.

Modern cryptographic operations require very large quantities of keying material. This material can take any of a number of forms and can be stored on record wires or discs, on perforated tapes, and in other fashions. The storing means forms no part of this invention (although it may be mentioned briefly hereinafter), and the key to which reference will be made below will be assumed to be a sequence of mark-space or on-off signals.

The principal object of this invention is to provide means for supplying control signals for a key generator of the nature mentioned.

Another object is to provide an apparatus of the character described for producing a substantially noncyclic control signal for a key generator.

Other objects will be apparent from a reading of the following specification and claims.

Figure 2:
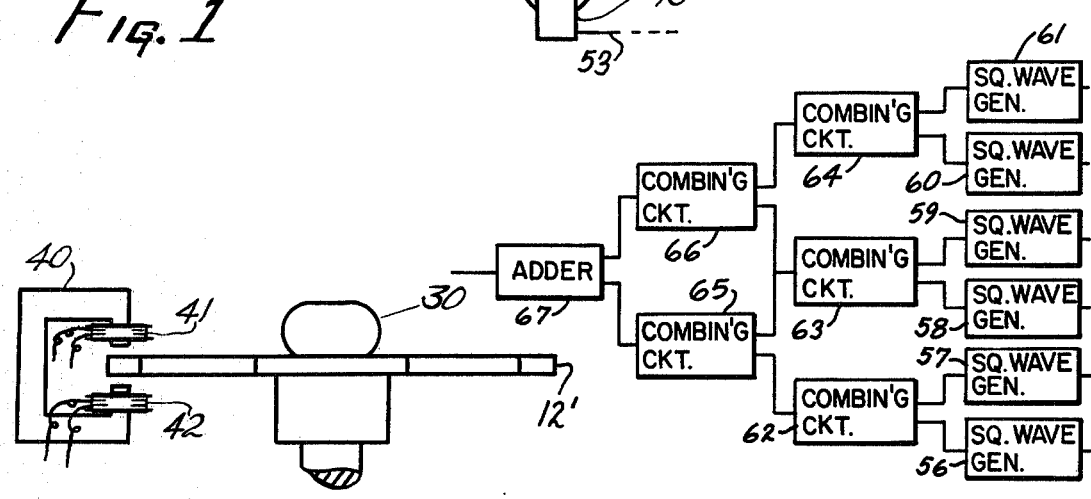

In the drawings (both figures being somewhat diagrammatic):

FIG. 1 is an illustration of the principal features of the invention, some of the parts being broken away; and FIG. 2 is a showing of a magnetic pickup utilized in the practice of the invention.

Referring to the drawings and particularly to FIG. 1, there may be seen a main driving element 10 in the nature of a spur gear, and surrounding the driving element, six driven members whose peripheries comprise gear teeth normally meshing with the teeth of spur gear 10. Only 11, of the driven elements, may be seen in the figure; the other gears, however, will be referred to further hereinafter and should be considered to be numbered 12 through 16, clockwise.

The six driven elements are of different sizes, that is, each has a different number of teeth than any of the others. For cryptographic purposes, the numbers should be large, and perferably they should be prime. In the preferred embodiment, gear 11 has 101 teeth, and the other corresponding gears have variously 106, 107, 103, 105, and 109 teeth.

Each wheel or gear, including the driving gear 10, is provided with a pattern disc secured to or otherwise arranged to rotate therewith. The pattern disc for member 11 bears reference character 11', and the other discs are 12', 13', 14', 15', and 16'. Each of these discs may be secured right to one face of its cooperating driven gears. In order, however, to avoid difficulty in the actual driving operation (interference between the discs), the disc 10' for the gear 10 will ordinarily be spaced somewhat from the face of its gear, any convenient type of spacing element being employed. The other discs may be spaced from their gears if desired.

Each pattern disc is provided with a scale such as that designated 11' in FIG. 1. These scales are utilized along with bench marks 20—20 on the disc 10' of the gear 10 to align the wheels properly at the beginning of an operation, as will be further described.

Keying slots, as 21, may be formed in random positions in the several pattern discs although usually their positions will be calculated. In any event, each slot must be of unit length or of a multiple of such unit length. Each slot, in other words, must be one unit in length, two units, three units, etc. The slots should be oriented exactly with the index marks on the discs which, in turn, are oriented with their respective gear teeth. This makes it possible to "read" the several discs simultaneously as will be described hereinafter.

It may here be pointed out that in the drawings the numbers of teeth in the various discs, the scales thereon, etc., do not correspond with the preferred form of the invention herein described. The simplified drawings, however, do illustrate the principal features of the structure.

Disc 10', unlike the driven discs, includes a regular arrangement of slots 25—25, the number being arbitrarily fixed, and not of particular importance in the practice of the invention, slots 25—25 being used for timing purposes.

The wheel 10 is adapted to be driven at a constant speed by any convenient type of motor (not shown). The gears 11 through 16 are mounted in some fashion which will permit their ready removal from the apparatus or at least their disengagement from the driving gear 10. Preferably, they are spring held in engagement so that by grasping a knob, as 30, a gear can be drawn forward or upward against the tension of such an associated spring (not shown) until it disengages gear 10, then turned to its desired new position relative to gear 10, and reengaged by means of the spring. This is a well-known expedient, and it is believed to be unnecessary to illustrate the same. In any event, it is not an essential part of the construction, it being entirely feasible to fasten the gears 11 through 16 to their cooperating shafts with nuts and washers. Likewise, no bearings are shown in the drawings; balls or rollers are desirable, and their construction and mounting will be apparent to those skilled in the art.

Arranged adjacent to each of the pattern discs 10' and 11' through 16' is a magnet, as 40, which serves to pick up impulses utilized in the invention. The arrangement can best be seen in FIG. 2 which shows the periphery of disc 12' running between the poles of magnet 40. The magnet is provided with two windings 41 and 42; 41 carries a constant current, whereas winding 42 is a pickup coil.

The output of pickup winding 42 is a series of peaks produced by the leading and trailing edges of the several metal tongues, which separate the slots from the periphery of the disc, as the tongues pass through the field of magnet 40. The output signal may be used to control a square wave generator in known fashion.

It will be apparent that, considering disc 12' alone, the sequence of mark-space signals will repeat after one revolution or 106 signal elements. Such a sequence would be relatively useless for cryptographic purposes, but, if pattern discs 12' and 11' are considered together, their outputs being combined according to the so-called Vernam rule (see U.S. Pat. No. 1,686,585), the sequence will not repeat until after some ten thousand signal elements.

According to the preferred mode of practicing the invention, the six wheels 11, 12, 13, 14, 15, and 16, with their pattern discs, are combined in pairs, and the three resulting sequences, each different from the others and each slightly different in length, are again combined to produce a cycle which effectively never repeats.

The means for combining the three sequences forms no part of this invention. In high speed operation, it will be desirable to use an electronic combining circuit. A suitable circuit is shown in the combination of Kohler, U.S. Pat. No. 2,567,214.

A representative arrangement for producing the desired end product is shown schematically in FIG. 1 wherefrom it may be seen that six leads 50 through 55 are utilized, each being connected to a different one of the several pick-up windings. Each lead controls one of the square wave generators 56 through 61, and the outputs thereof are fed in pairs to the combining circuits 62 through 64. Two additional combining circuits 65 and 66 are provided. The output of combining circuit 63 is fed into circuit 65 along with the output of combiner 62, and the output of combiner 63 is also further combined with the output of circuit 64, at 66. A further combining or adding operation is accomplished in circuit 67, and the output of this last mentioned circuit is applied to a tape or other suitable storage device (not shown). All of the several combining or adding circuits may be identical, and all may be of the type disclosed in the above-mentioned Kohler patent.

Magnet 50, which cooperates with disc 10' on the drive gear 10, provides impulses which aid in interpreting the output of the key generator.

In operation, the gears 11 through 16 (or some of them) are disengaged from driving gear 10 and their pattern discs individually aligned with the six bench marks 20 on mask 10'. For example, the zeros on all discs may be made to coincide with the bench marks. The motor is then started, its speed being held constant by any convenient means. The signals generated by the pickup magnets 40 and their cooperating discs are combined in pairs, then recombined, and usually stored upon a magnetic wire or paper tape.

Should a duplicate operation be required, it can be assured by resetting all wheels to their initial positions with respect to their bench marks.

Succeeding operations will commonly be initiated with the wheels in different positions relative to disc 10' and to each other.

The combination of slotted discs and magnets of the nature described and shown is believed to be novel, but it is not essential to the practice of the invention since it will be apparent that the discs could be perforated and one or more light sources employed with a photocell for each disc to produce essentially the same result.

Further, it will be apparent that, although reference has herein been made to on-off and mark-space signals, these are not of the essence of the invention, it being of importance only that two distinguishable signals are generated.

The foregoing description is in specific terms, and many modifications will suggest themselves; for the true scope of this invention reference should be had to the appended claims.

I claim:

1. In an apparatus for generating a substantially noncyclic sequence of binary electrical values, a driving gear, an even number larger than two of pattern discs driven by said gear each said disc being provided with a number of peripherally arranged impulses producing elements the numbers thereof being preferably large and preferably randomly arranged in the said discs, means responsive to movement of the impulse producing elements of each said disc upon rotation thereof for generating a sequence of electrical impulses, a square wave generator for each said disc and means for controlling the output thereof by the sequence of impulses thereof the outputs of said square wave generators being an even plurality greater than two of sequences of binary values, means for sequentially combining algebraically said last mentioned outputs in pairs value-by-value, thereby to produce for two said sequences a single sequence of binary values; and means for algebraically combining said last mentioned sequence with any other sequence similarly produced thereby to produce from two such sequences a further single sequence of binary values.

2. An apparatus for producing a substantially noncyclic sequence of binary electric values, including a driving gear, a plurality of driven gears associated with said driving gear, each of said driven gears having a pattern disc carried thereby, each said dics having a plurality of radial slots in its periphery, means for utilizing the slots of each said disc to produce a sequence of binary electric values, means for substantially combining pairs of sequences so produced, value by value, to produce a lesser number of new sequences of binary electric values, and means for combining said new sequences in pairs, value by value.

3. In an apparatus for generating a substantially noncyclic sequence of binary electric values, a driving gear, a disc adjacent said driving gear mounted for rotation therewith, said disc being provided with a regular sequence of peripheral radial slots, an even number larger than two of driven gears each provided with a pattern disc mounted for rotation with its gear and each having a number of peripheral radial slots therein, the numbers of such slots in said discs being relatively large and the arrangements thereof preferably differing, means for generating a separate sequence of binary electrical values by means of the peripheral slots in each of the said pattern discs of said driven gears, means for electrically combining said sequences in pairs, value by value, and means for combining the resulting sequences sequentially in pairs, value by value.

* * * * *